(12) United States Patent
Hum et al.

(10) Patent No.: US 6,842,116 B2
(45) Date of Patent: Jan. 11, 2005

(54) SHORT RANGE COMMUNICATION SYSTEM

(75) Inventors: Peng Jong Hum, Singapore (SG); Walter Van De Velde, Brussels (BE); Ozan Cakmakci, Brussels (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/414,166

(22) Filed: Apr. 15, 2003

(65) Prior Publication Data

US 2003/0193399 A1 Oct. 16, 2003

Related U.S. Application Data

(63) Continuation of application No. 09/464,538, filed on Dec. 15, 1999, now Pat. No. 6,714,133.

(51) Int. Cl.[7] .............................................. G08B 23/00
(52) U.S. Cl. ................................ 340/573.4; 340/573.1; 340/572.1
(58) Field of Search ........................ 340/539.1, 539.13, 340/539.31, 573.1, 573.4, 825.36, 825.49, 5.3, 10.1, 10.3, 10.6; 342/357.01, 357.06, 450, 457; 345/173

(56) References Cited

U.S. PATENT DOCUMENTS

| | | | | |
|---|---|---|---|---|
| 5,552,772 A | * | 9/1996 | Janky et al. | 340/573.4 |
| 6,100,806 A | * | 8/2000 | Gaukel | 340/573.4 |
| 6,198,394 B1 | * | 3/2001 | Jacobsen et al. | 340/573.1 |
| 6,209,144 B1 | * | 4/2001 | Carter | 2/458 |
| 6,369,804 B1 | * | 4/2002 | Sandbach | 345/173 |

* cited by examiner

*Primary Examiner*—Van T. Trieu
(74) *Attorney, Agent, or Firm*—Aaron Waxler

(57) ABSTRACT

Short range communication systems and techniques are described. In an implementation an interrogator held near a person interrogates multiple transponders and receives information separately from the transponders. The interrogator and/or the transponders may be held in an article of clothing or in a personal effect of the person. The transponders may transmit identifying information and/or information associated with the states of the articles of clothing or personal effects of the person. Such a system enables the clothes worn by a person to communicate with a plurality of items and obtain useful information. In addition, a network system may be configured so that any particular transponder may communicate with another transponder or group of transponders of other locales to activate functions, cause actions or otherwise share data and/or information.

9 Claims, 10 Drawing Sheets

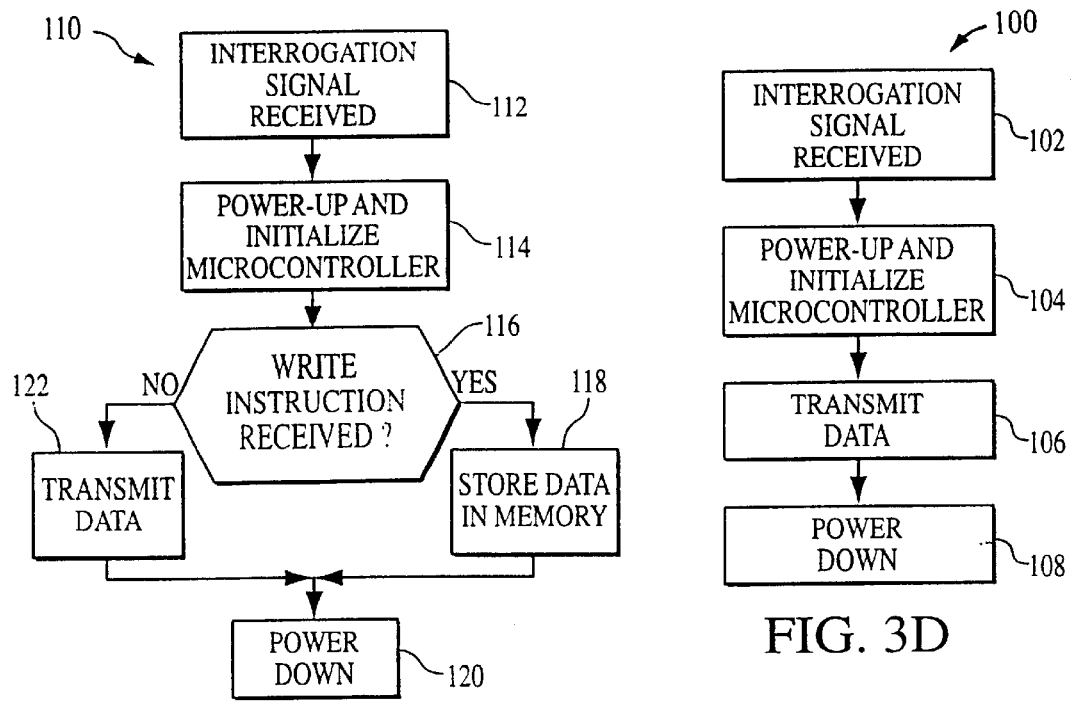
FIG. 3E
FIG. 3D
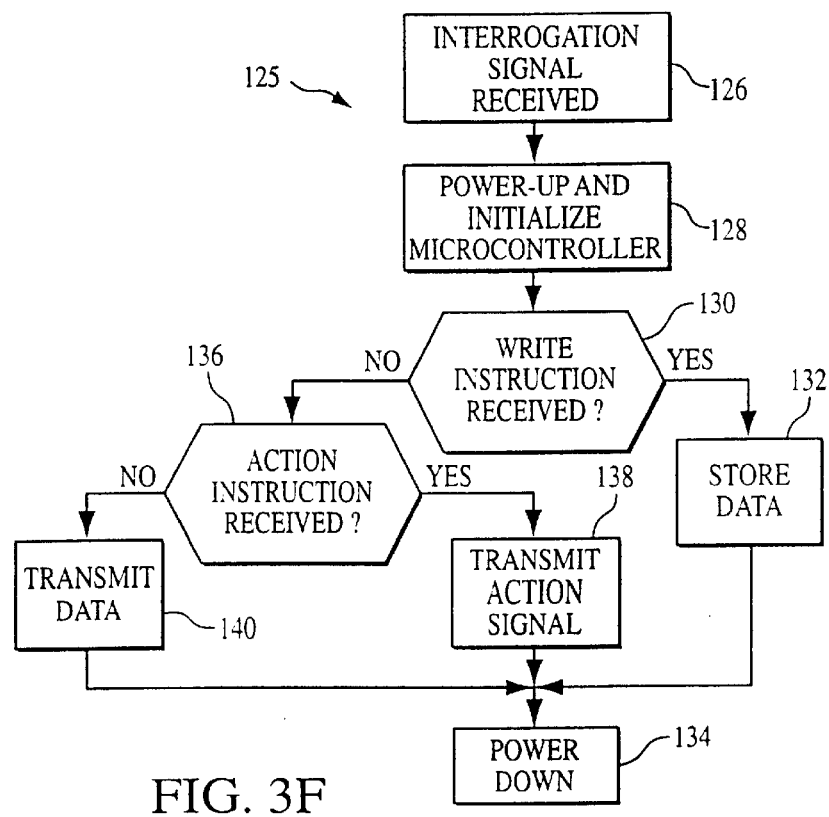
FIG. 3F

SHORT RANGE COMMUNICATION SYSTEM

CROSS REFERENCE TO RELATED APPLICATIONS

This is a continuation divisional of application Ser. No. 09/464,538, filed Dec. 15,1999 now U.S. Pat No. 6,714,133.

BACKGROUND

The invention relates to short-range data communication.

Radio frequency identification (RFID) systems, for example, typically include a reader or interrogator, a transponder and a data processor. The reader may include an internal microcontroller, a transmitter, a receiver, and an antenna. The transponder is usually a passive device (having no power source) embedded in a card or key tag, and may include an antenna and a RFID application specific integrated circuit (ASIC). The interrogator transmits an electromagnetic wave defining a surveillance zone. When a transponder enters the zone, the electromagnetic energy from the interrogator begins to energize the ASIC in the transponder, which initializes and then broadcasts an identity signal.

A RFID system may use a low-energy, back-scattering technology that selectively reflects or back-scatters the electromagnetic energy from the transponder back to the interrogator. Receiving circuitry in the interrogator senses and decodes the back-scattered signal to determine the identity of the transponder. Such a system may be used to identify, track and/or locate people or objects.

In a typical application, when an acceptable identity signal has been received, an interrogator generates a signal to unlock a door for entry of the carrier of a key tag transponder. Another application uses button transponders attached to an article of clothing to communicate with an interrogator in a washing machine or the like. The button transponders communicate data to the interrogator that are used to alter the water temperature and/or the cleaning cycle for the clothing.

RFID systems typically offer a single communication path between a reader and the transponders, and have short read ranges between the interrogator and a transponder, which may be measured in centimeters. Greater ranges, very often the goal of RFID systems, require use of higher power levels and/or increased antenna size, and produce less confined radio frequency fields.

SUMMARY

Presented is a method, from an interrogator held near a person, of interrogating multiple transponders in the vicinity of the person. As a result of the interrogating, information is received separately from the multiple transponders.

The method may include one or more of the following features. The interrogator may be held in an article of clothing or personal effect of the person. The articles of clothing or personal effects may include at least one of pants, shirts, jackets, coats, earphones, glasses, listening devices, necklaces, rings, watches, bracelets, walking sticks, hockey sticks, guns, cups, and other fashion and everyday accessories and items, hats, socks, shoes, ties, underwear, outerwear, pens, pencils, personal digital assistant devices, laptop computers, desktop computers, bags, backpacks, luggage, wallets, money clips, timepieces, wristwatches, cell phones, desk phones, pedometers, temperature sensors, global positioning devices, environmental sensors, biological sensors whether worn on the garments or below the epidermal skin layer of the human body or embedded or mobile within the human body, fitness devices and other appliances and equipment. The transponders may be associated with respective articles of clothing and personal effects of the person, and the information received from the multiple transponders may include identifying information or information associated with states of articles of clothing or personal effects of the person or sensor readings of the environment or of the person. In addition an activation signal may be transmitted from at least one of the transponders, that could be used to activate another device or transponder to perform a function such as transmit data, start an actuator or display information.

In another implementation, a method includes radiating an interrogation field over less than a predetermined distance from a radiator. Then from at least one position within the predetermined distance, carrying energy associated with the interrogation field along at least one respective conductive element to at least a first location that is farther than the predetermined distance from the radiator, and at each location, radiating an interrogation field using energy that has been carried along the conductive element.

This implementation may include at least one or more of the following features. The radiator may be an interrogator. The interrogation field may be a radio frequency field. A transponder may be located within a predetermined second distance of at least one location. The conductive elements may be electrical conductors. The method may include deriving the energy carried along the conductive elements inductively from the interrogation field. The method may also include, from a position that is within a predetermined second distance from at least the first location, carrying energy associated with the interrogation field along at least one additional pair of conductive elements to at least a third location. At least two respective conductive elements may also carry modulations of the interrogation field from the first and second locations to the positions that are within the predetermined distance of the radiator.

In yet another implementation, a short-range communication system includes an interrogator, a network of coupling ports, communication lines connecting the coupling ports to the interrogator, and at least one transponder associated with an object. The transponder may establish communications with at least one of the coupling ports and the interrogator.

The communication system may include one or more of the following features. The interrogator may include a microcontroller that transmits at least one interrogation signal to initiate communications. An output device may be connected to the interrogator. An input device may be connected to the interrogator. The interrogator may include a switch for initiating and terminating interrogation signals, and the interrogator may include a receiver to receive signals from each of the transponders. At least one of the transponders may be configured to send an activation signal. The system may include electronic circuitry to increase the sensitivity of the coupling ports.

In a further implementation, a short-range communication method includes creating a network of coupling ports in a material, connecting an interrogator to the network, and activating the coupling ports to interrogate at least one transponder.

Implementations of the short-range communication method may include one or more of the following features. The interrogator may generate interrogation signals in a status reporting mode to determine which transponders are within range of the coupling ports. The interrogation signals may be transmitted along a predetermined or assigned set of communication lines and associated coupling ports in a sequential or broadcast manner. An anti-collision protocol may be used if at least two transponders respond to the same interrogation signal. The interrogator may generate interrogation signals in a locating mode to locate the transponders in the network, and the interrogator signals may be transmitted along a predetermined or assigned set of communication lines and associated coupling ports in a sequential or broadcast manner. In locating mode, an anti-collision protocol may be used if at least two transponders respond to the same interrogation signal. The interrogator may also generate interrogation signals in a position mode to determine the position of a particular type of transponder, and the interrogation signals may be transmitted along a predetermined or assigned set of communication lines and associated coupling ports in a sequential or broadcast manner.

A communications system according to the invention can advantageously be used in a wide variety of applications. For example, an implementation of the invention enables clothes worn by a person to communicate with a plurality of items and obtain useful information. In addition, a network system according to the invention may be configured so that transponders may communicate with other transponders or devices to activate functions, cause actions or otherwise share data and/or information. Other advantages and features will become apparent from the following description and from the claims.

BRIEF DESCRIPTION OF THE DRAWINGS

FIGS. 3D, 3E and 3F are flowcharts illustrating transponder function implementations.

DETAILED DESCRIPTION

Figure 1:
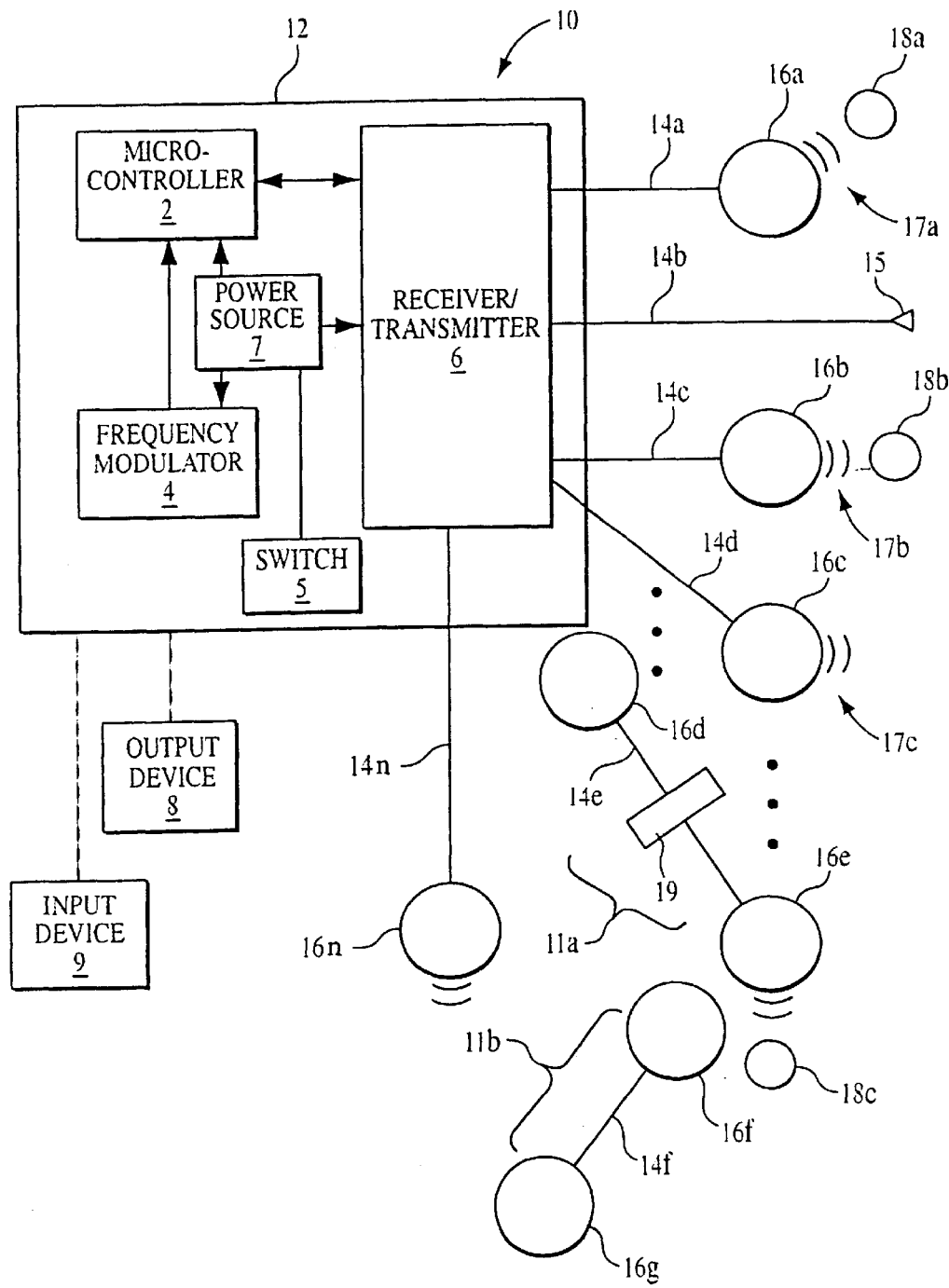
FIG. 1 is an implementation of a low-power, short-range communication system according to the invention.

FIG. 1 shows an implementation of a low-power, short-range communication system 10 for communicating with one or more transponders. The communication system 10 includes a wireless interrogator 12, communication lines 14a to 14n, which may be pairs of conductive wires or conductive fibers, and coupling ports 16a to 16n. The coupling ports may be circular loops (coils) and operate as antennas to transmit the interrogation signals wirelessly. In particular, each coupling coil may be designed to behave like an inductor. Thus, each of the coils may have a number of turns and produce a magnetic field that varies with the interrogation signal generated by the interrogator.

The interrogator 12 includes a microcontroller 2 connected to a frequency modulator 4 and to a receiver/transmitter 6. The receiver/transmitter module may include a form of suitable modulation and demodulation circuitry to condition/modulate the interrogation signals with the correct amount of power and security and within a certain bandwidth around a particular center frequency for transmission over the media, and to receive using demodulation techniques the transponder response signals with an acceptable level of signal accuracy and integrity. In addition, error correction features may be used. A power source 7 may be connected to each of the other circuit elements and to a switch 5 that may be utilized by a user to activate the interrogator 12. The interrogator may also include or be connected to an output device 8 that may be used to indicate information to the user, such as the presence of transponders or to store data received from a particular transponder for later analysis, or to process the data. The output device may also be a means for providing Internet access to the interrogator so that data may be transmitted via e-mail, for example, to enable e-commerce. In addition, the output device may enable the interrogator 12 to transmit data or information via a cell phone using transmission protocols such as GSM or CDMA, Bluetooth, Home RF, or any current or future wireless protocols, for example, 3G ($3^{rd}$ Generation wireless cellular standards), or to transmit data via standard line telephones or via other communication devices. The interrogator 12 may also include, or be connected to, a data input device 9 that may be used to enter data or information to the interrogator, or to send data or information to a transponder, or both. Thus, the input device may be used for various purposes, such as updating information, or loading a new version of software or for data transmission and/or to request data retrieval.

Some of the communication lines, such as line 14b, may terminate in a socket 15 or other connector for direct connection to a transponder or may be directly wired to a transponder or actuator or other types of electronic devices. In addition, the system may include one or more coupling connectors 11a and 11b. The coupling connector 11a includes a coupling port 16d for wireless connection to the interrogator 12, a communication line 14e, and a coupling port 16e for establishing communication with a transponder 18c or with another coupling connector 11b. The coupling connector 11b includes a coupling port 16f, a communication line 14f and a coupling port 16g. Thus, coupling connectors may wirelessly connect to each other, to an interrogator or to one or more transponders.

The interrogator 12 generates interrogation signals 17 that may be wirelessly broadcast directly from the interrogator (from an antenna not shown), and that are carried on the communication lines to the coupling ports for communication with various transponders. The diameter, size or geometry of the coupling coils and the number of turns used in each are determined such that communication with a transponder or interrogator is possible in the manner described below. Further, the communication system may include power-boosting electronic circuitry, highly-ferromagnetic disks or similar materials (not shown) on the coupling ports or matching networks between the coupling ports to increase the power or concentration of the signals that are distributed in the system. The result is increased range and reading sensitivity of the interrogator. For example, a power booster 19 may be used on communication line 14e that could include a network of resistors, inductors, capacitors, active devices like diodes, transistors, or other electronic components and/or other integrated circuit chips like voltage doublers. Such power booster devices could also be connected to one or more coupling ports.

Different types of interrogation signal schemes or modes may be used. For example, in a status reporting mode, the interrogator broadcasts interrogation signals using a certain frequency to each of the coupling ports 16a to 16n in a predetermined or sequential manner. The goal of the status mode is to have all of the transponders in the system respond so that the system can report how many and what types of transponders are available. For example, interrogation signals using frequency $X_1$ may be transmitted to all or a certain configuration of coupling ports at time $t_1$, then interrogation signals using frequency $X_2$ may be transmitted to all or a certain configuration of coupling ports at time $t_2$, and so forth. Consequently, each transponder within range of the interrogator 12 or a coupling port 16a to 16n would respond when it senses a predetermined frequency signal. When multiple transponders of the same type are in a range of one or more coupling ports, they will respond by way of anti-collision protocols. Each transponder is identified by a distinct identification signal or ID code that it transmits to the interrogator according to an anti-collision protocol that may give priority to certain identification signals or ID codes in relation to others.

Next, a location mode of operation may be implemented. The interrogator may generate and transmit an interrogation signal that includes components intended for different transponders. The goal of the location mode is to locate where all of the transponders are in the system. The components may be transmitted in a predetermined and/or sequential manner. Each of the components of the signal is carried on all of the communication lines 14a to 14n in an arbitrary pattern and transmitted from all or an arbitrary number of the coupling coils, but is intended to communicate with only one of the transponders, say transponder 18a. Consequently, when the coupling port 16a broadcasts the interrogation signal 17a one of the components of the signal will be intended for transponder 18a. The signal will cause the transponder to initialize and send an identification signal or ID code and/or data back to the interrogator through the coupling port 16a and communication line 14a. The other coupling ports will simultaneously broadcast or transmit in an arbitrary pattern the same component of the interrogation signal 17a to the other transponders 18b and 18n but those transponders will not respond. If the transponder 18a had been placed within range of coupling port 16c, instead of near coupling port 16a, then the transponder 18a would still have responded, resulting in an identification signal or ID code and/or data being sent to the interrogator via port 16c and the communication line 14d. Consequently, transponder 18a would be known to be in the vicinity of at least one of the coupling ports. If multiple transponders of the same type are within range of the coupling port 16a in this example, then each of them would respond using an anti-collision protocol which gives priority to one transponder response over another. Thus, in the locating mode the interrogator may use different RF modulation modes in a sequential or predetermined manner, and each type of transponder is configured to respond to a particular one of the frequencies no matter where in the system it is located.

In addition, a position mode of operation may be implemented. The interrogator may be configured to recognize that a particular transponder is in a particular position with respect to the user when a response is received from a particular communication line or from a particular coupling port. Thus, the goal of the position mode is to query a specific area to see if a transponder is in the correct position. In order to function in this manner, an interrogator may be mapped to a particular network configuration of signal lines and coupling ports. For example, the interrogator may transmit an interrogation signal on one of the communication lines having signal components for locating a particular one or type of transponder. When a response is received, the interrogator recognizes that the response came from a rear pocket of a pair of pants, for example. Such information may then be displayed or otherwise communicated to a user. If two or more transponders are in the same pocket, then an anti-collision protocol would be used and the user informed of the presence of each one. Alternately, the interrogator may be configured to serially transmit an interrogation signal on the communication lines, or may be configured to address a particular group of communication lines, in a predetermined manner or sequence to locate a particular transponder or groups of transponders.

The status mode, location mode and position mode of operation may be implemented in that order as a communication protocol for the system. Alternately, a user may implement one or more of such modes. For example, the user may be provided with a keypad or other output device for punching in a code to instruct the interrogator to implement one or more of the operating modes.

The interrogator 12 may be a low-power device, and the power source 7 may be a battery, solar device or other source of power. Power consumption of interrogators used in such systems may be on the order of a few milli-watts or a few watts, and the range of the electromagnetic fields generated by such interrogators may vary depending on operating frequency and power consumption. For example, interrogators operating at 125 kHz may have maximum read ranges of from 5 to 20 centimeters or more depending on the size of the antenna and the current input to the antenna. The read range, r, of RFID systems is directly proportional to the size or radius a of the antenna, thus r∝a. Consequently, the bigger the antenna the further the range, and a larger antenna requires input of larger amounts of current. Interrogators operating at 13.5 MHz or 433 MHz or other frequencies would have different read ranges. Interrogators operating at different frequencies may be suitable for use in the short-range communication system 10.

Referring again to FIG. 1, the microcontroller may be a microprocessor or an application-specific control circuit. Further, the microcontroller, frequency modulator, and the receiver/transmitter module could be fabricated as an application-specific integrated circuit (ASIC) on a single chip. The output device 8 may be a liquid crystal diode (LCD) display, a light-emitting diode array (LED array), an audible indicator, a microprocessor system, a personal digital assistant (PDA), a desktop computer, a laptop or any portable computer, or any other type of display, processing device, or storage device. The output device could also include a microcomputer for storing, processing, displaying and/or analyzing data gathered from one or more transponders. The input device 9 may be a keypad, a keyboard, a touch screen, a microphone, a personal digital assistant (PDA), a desktop computer, a portable laptop computer or other input means for inputting data and/or information to the interrogator and/or to one or more transponders.

Figure 2A:
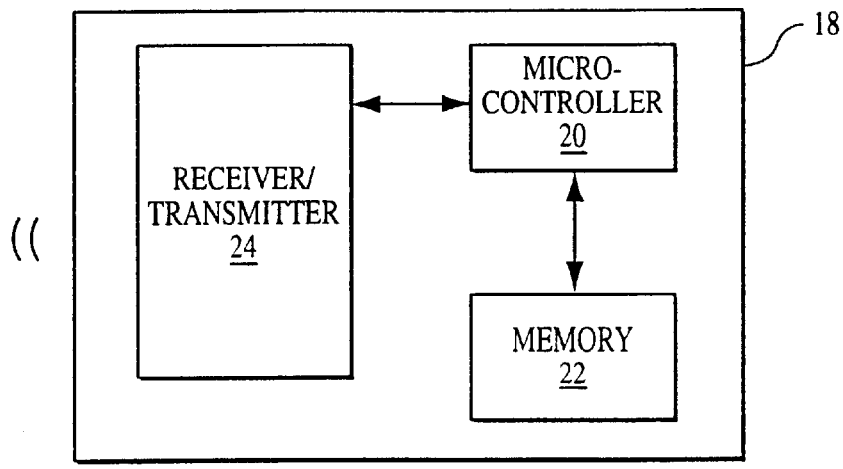
FIGS. 2A and 2B are simplified block diagrams of transponders of a type that may be used in the system of FIG. 1.
Figure 2B:
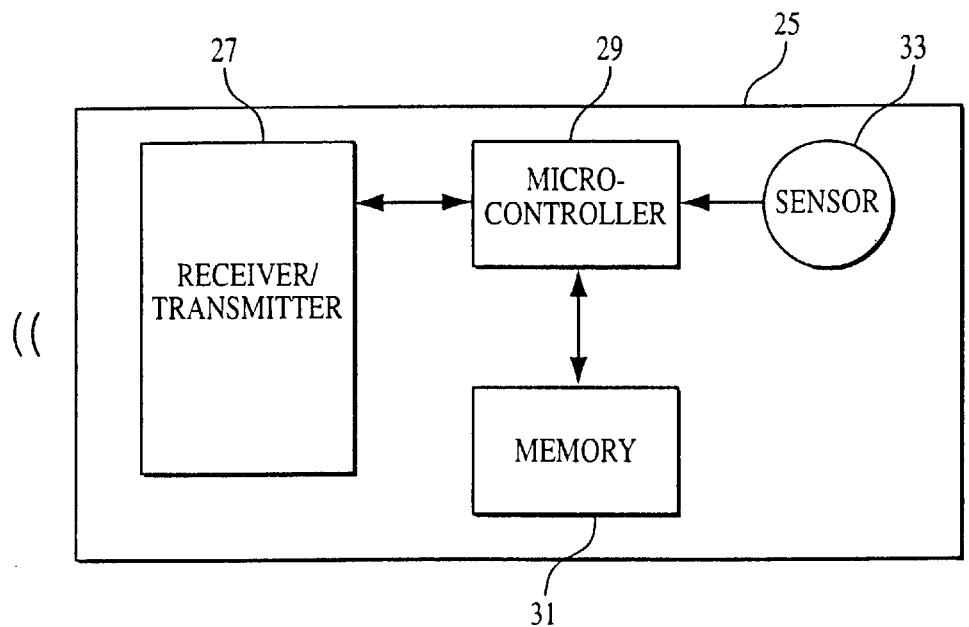

FIGS. 2A and 2B are simplified block diagrams of implementations of transponders 18 and 25 of a type that may be used in the communication system 10 of FIG. 1. Referring to FIG. 2A, the transponder may include a microcontroller 20 connected to a memory 22 and to a receiver/transmitter 24 which may contain modulation and demodulation circuitry. The transponder 18 may alternately be fabricated as an ASIC on a single silicon chip including a receiver/transmitter and controller circuitry along with a memory element. The memory may store an identification code, or other data related to a particular object to which it corresponds. The transponder is typically a passive device, but may include a battery source. A passive transponder absorbs energy to power its circuitry from the received interrogation signals. The transponder may also be configured to collect data from the object or item that it is associated with for later transmission to the interrogator. Thus, the transponder may be a read-only or a read/write type. The receiver/transmitter 24 rectifies the energizing RF field into direct current (DC) and powers up the microcontroller 20. The microcontroller then initializes and transmits an identification code and/or other data from its memory to the interrogator. In addition, the transponder may be configured to send an "action" signal to another transponder or other devices to perform certain functions, such as initializing a microactuator or micromotor, energizing a LED array or other visual display, generating sounds or other actions. Further, the transponder may include a plug or socket or other connector (not shown) for physical connection to other devices to permit signaling of action signals or to exchange data and/or information.

FIG. 2B is a simplified block diagram of an implementation of a transponder 25. The transponder may include a receiver/transmitter 27 which may contain modulation and demodulation circuitry, a microcontroller 29, a memory 31 and a sensor 33. A battery (not shown) or other source of power may be included. The transponder 25 may be fabricated as an ASIC. The transponder may utilize sensor 33 to sense the environment, sense motion, temperature, acceleration, light, biological conditions or some other condition and store data in memory 31 for later transmission to an integrator or other transponder. The sensor 33 may also be configured to cause the transponder to send a signal to the interrogator or to activate some functions in other devices that may be connected to it, or to send a signal to another transponder when a predetermined condition or conditions are met. For example, if the temperature rises past a certain level, the transponder may be configured to send a warning signal to an interrogator for communication to a user or to activate some cooling devices. Further, the transponder may include a plug or socket or other connector (not shown) for physical connection to other devices to permit signaling of action signals or to exchange data and/or information.

Figure 3A:
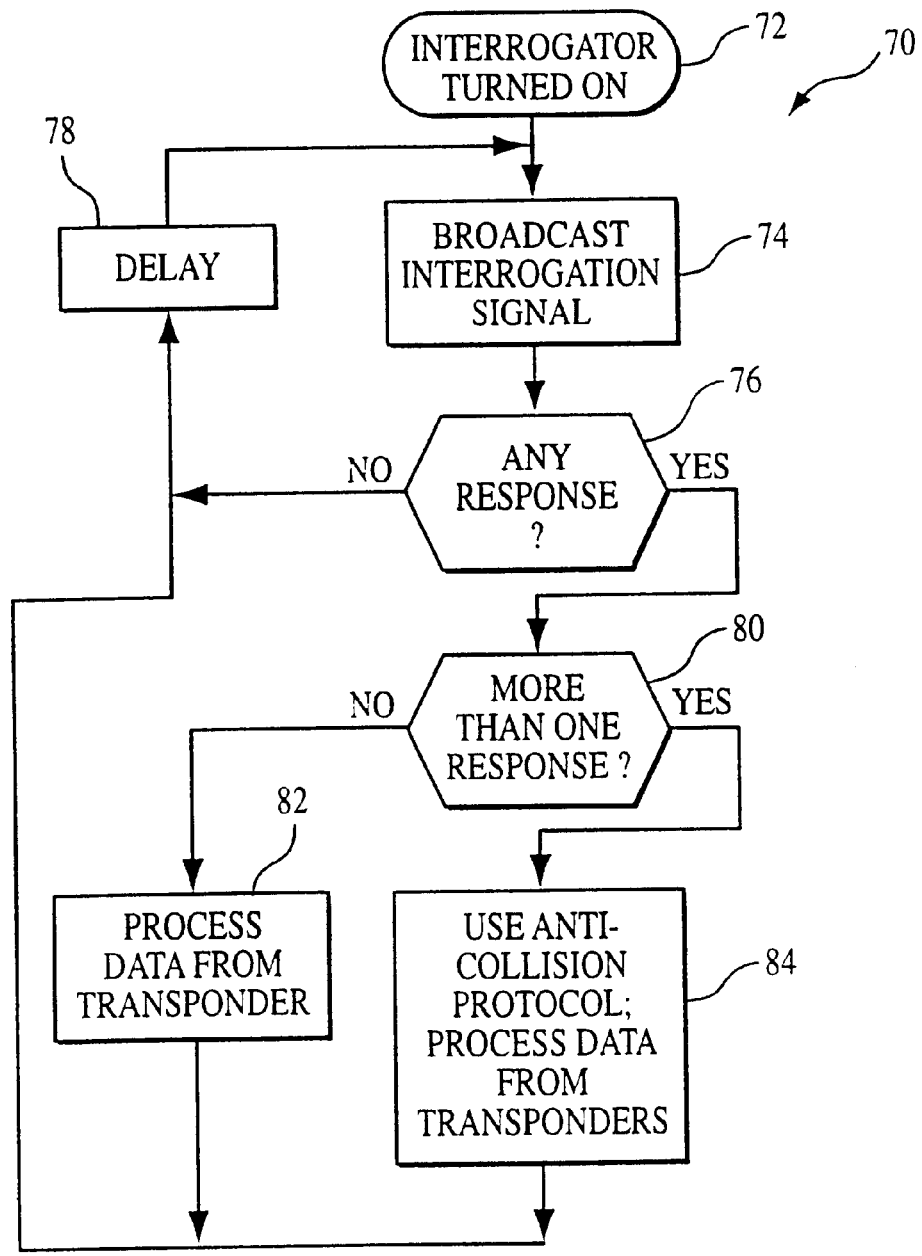
FIGS. 3A, 3B and 3C are flowcharts illustrating interrogator status reporting mode, location mode and position mode implementations according to the invention.
Figure 3B:
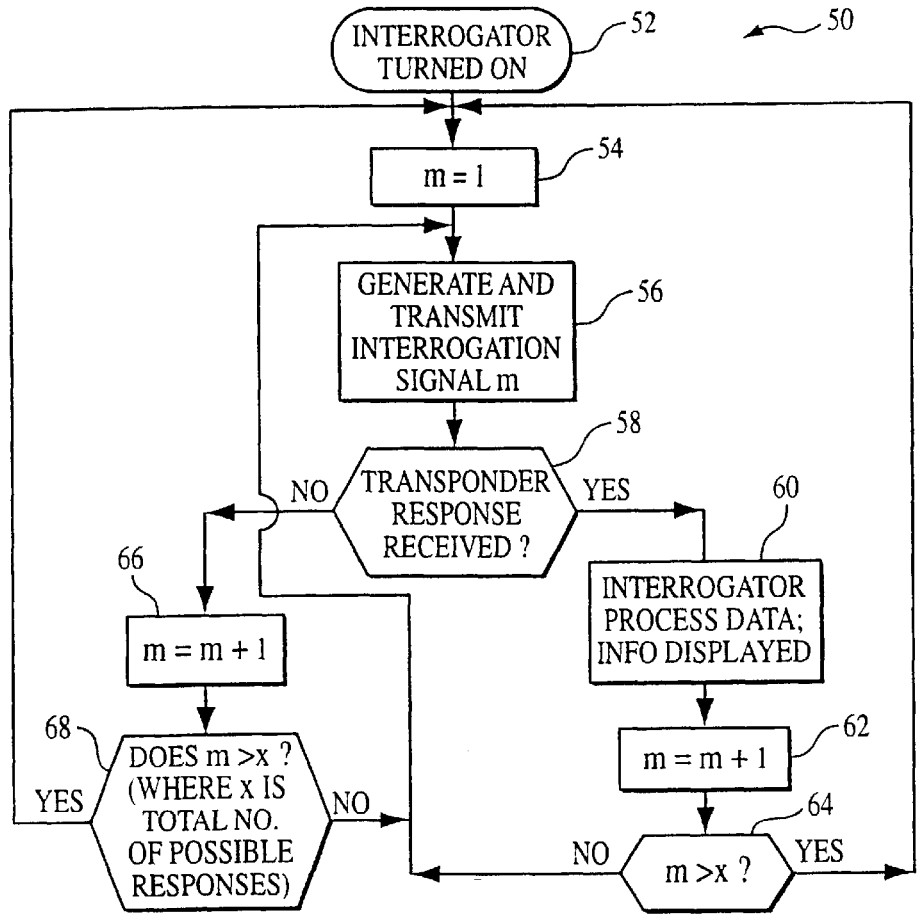
Figure 3C:
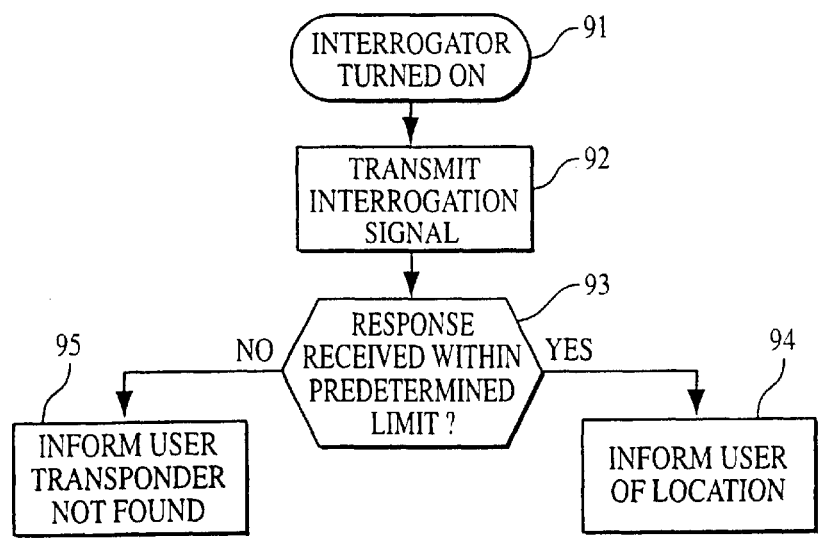

FIGS. 3A to 3C are flowcharts 70, 50, 90 illustrating implementations of a status reporting mode, a locating mode and a position mode respectively, of interrogator functions. Referring to FIG. 3A, the flowchart 70 illustrates an interrogator status reporting mode. The interrogator is turned on 72 and sends 74 an interrogation signal on all of the communication lines to all of the coupling ports, sequentially or in another manner, in an attempt to find out which transponders are present. If no response is received 76 then, after a delay 78 the interrogation signal is again broadcast 74 in the communication system. If there is a response 76 then the interrogator determines 80 if data from more than one transponder has been received. This can be accomplished because each transponder may have a unique identity code. If only one transponder responded, then the data is processed 82 and after a delay 78 an interrogation signal is again broadcast 74.

If it is determined 80 that more than one transponder responded, then a collision condition exists, which could cause the received message to be corrupted and indecipherable. Therefore, an anti-collision protocol may be used 84 and the transponder will respond in accordance with a priority scheme that may be based on the identification codes of the transponders. For example, data from a transponder associated with a money holder such as a wallet may have priority over data from a transponder associated with a backpack. As described above, information regarding how many and which types of transponders may be displayed to the user and/or transmitted to an output device for processing. The interrogator in this implementation continuously generates and transmits an interrogation signal to every coupling port or communication line until the user turns the interrogator off. The interrogator may alternately generate and transmit interrogation signals in a predetermined pattern or according to an algorithm which may be suitable to a particular system. The interrogator may be configured to generate an alarm message to the user if no responses were received from a particular transponder, or if no responses were received from a particular group of transponders, or from any transponders.

Following the status mode of operation, a locating mode of FIG. 3B may be used. In the locating mode, the user turns on 52 the interrogator and a variable m is set equal to 1 in step 54. The interrogator then generates and transmits 56 an interrogation signal m. In this scheme, each interrogation signal may differ from another to distinguish between transponders. The goal is to locate where each transponder is in the system. For example, the interrogator may generate signals of different radio frequencies, signals having different amplitudes, signals of different power strengths, or other signal types including signals that include different combinations of characteristics, such as using modulation schemes like Amplitude modulation (AM), Manchester Coding, or any other modulation schemes. Each different interrogation signal corresponds to a particular transponder of the system, and each transponder may correspond to a different object or device. The interrogation signals for the different transponders are sent in sequence or in some other manner that permits them to be distinguished from one another. Next, the interrogator determines 58 whether or not the transponder associated with the m=1 interrogation signal has responded. If so, then the interrogator processes, through a suitable demodulation scheme, the data 60, and the user may be notified, or the data may be displayed to the user and/or otherwise transmitted to an output device for processing. The variable m is then incremented 62, and the interrogator checks 64 to see if m is greater than x, where x is equal to the total number of transponders that may be separately addressed by the system. If m is greater than x, then m is reset equal to 1 in 54, and the process starts again. If m is not greater than x, then the interrogator generates and transmits the m+1 interrogation signal in 56 to check for the next transponder and the process starts again.

If in 58 no transponder response was received, then the variable m is incremented 66 and m is checked 68 to see if it is greater than x. If m is greater than x, then m is set equal to 1 in step 54, and the process starts again. If m is not greater than x, then the interrogator generates and transmits the m+1 interrogation signal in 56 and the process starts again. In this implementation, once the interrogator is turned on then interrogation signals are serially generated and transmitted continuously until the user turns off the interrogator. Further, the interrogator may be configured to display a warning message or generate an alarm if no response is received from a particular transponder or if no response is received from a particular group of transponders, or from any transponders. This process is repeated for every coupling port or communication line in a system, or for a certain number of predetermined coil ports addressed by the interrogator.

FIG. 3C is a flowchart 90 illustrating an interrogator position mode of operation. This mode of operation may be used to find out the position of a particular transponder. The interrogator is turned on 91 and transmits 92 an interrogation signal targeted to a particular type of transponder. The interrogation signal may be broadcast over each communication line in the system, or over one or a preselected group of lines depending on how the interrogator is configured If a response is received within a predetermined time limit in step 93 then the user is informed of the position of the transponder. The interrogator may be configured to recognize the transponder position because it has been mapped to the communication lines of the system. If in step 93 no response is received within the predetermined time period, then the user is informed that the transponder is not present in the system. This technique may be used to determine the position of one or more types of transponders in a system. As explained above, if two or more transponders respond at the same time, then an anti-collision protocol is implemented so that the user will be accurately informed of all such transponders.

FIGS. 3D, 3E and 3F are flowcharts 100, 110 and 130 of implementations of transponder functions that depend upon whether a transponder is a read-only type or a read/write type or a read/write/action type. In FIG. 3D, a read-only type transponder receives an interrogation signal 102, powers up and initializes 104 its microcontroller. The transponder then transmits data 106, such as an identification code and/or other data, to the interrogator, and then powers down 108. This method may be used with either interrogation scheme described above.

FIG. 3E illustrates the operation 110 of an implementation of a read/write type transponder. In step 112 an interrogation signal is received which causes the transponder to power up and initialize 114 its microcontroller. Next, the microcontroller determines 116 if the interrogator issued a write instruction. If so, then the data or information associated with the write instruction is stored 118 in an EEPROM or other memory of the transponder, and the transponder then powers down 120. If no write instruction has been issued in 116, then the transponder transmits data 122 to the interrogator and powers down 120.

The flowchart of FIG. 3F illustrates a read/write/action type of transponder. In this implementation, a transponder is configured to send an action signal to cause another device to perform an act, such as to energize a micro-motor or to illuminate a display. In particular, the interrogation signal is received 126 and the transponder powers up and initializes 128 its microcontroller. Next, if a write instruction is received 130 then data is stored 132 and the transponder powers down 134. If a write instruction is not received in 130 then a check is made for an action instruction 136. If an action signal is received then an action signal is transmitted 138 and the transponder powers down 134. If no action instruction is received, then the transponder transmits data 140 and powers down 134. It should be understood that the action instruction can come from various sources, such as an interrogator, a sensor, other transponders or other devices, and the action signal that is transmitted may result in various actions being performed. For example, an action signal may cause a device to give a visual or audio indication, start a micro-motor, cause a device to produce heat or to cool a surface, or any other imagined action.

Many more types of transponder configurations and functions are contemplated. For example, a transponder may be configured to receive data from all types of other sources, such as the object or item with which it is associated or from another transponder of object through various means. Such transponders could first store, and then later communicate data or other information to an interrogator or to another transponder at a later time.

Figure 4A:
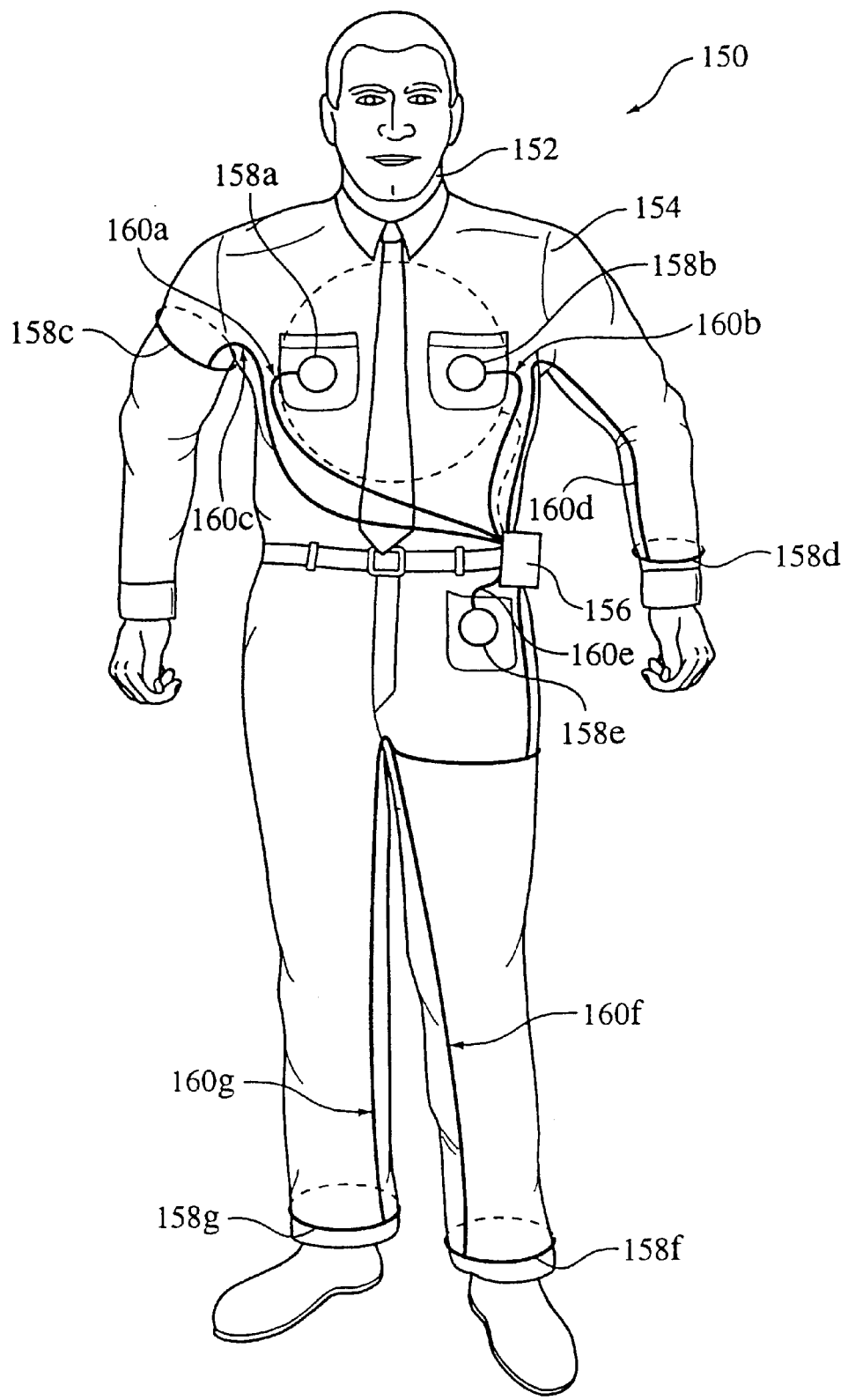
FIGS. 4A and 4B are front and rear views of a clothing implementation of a communication system according to the invention.
Figure 4B:
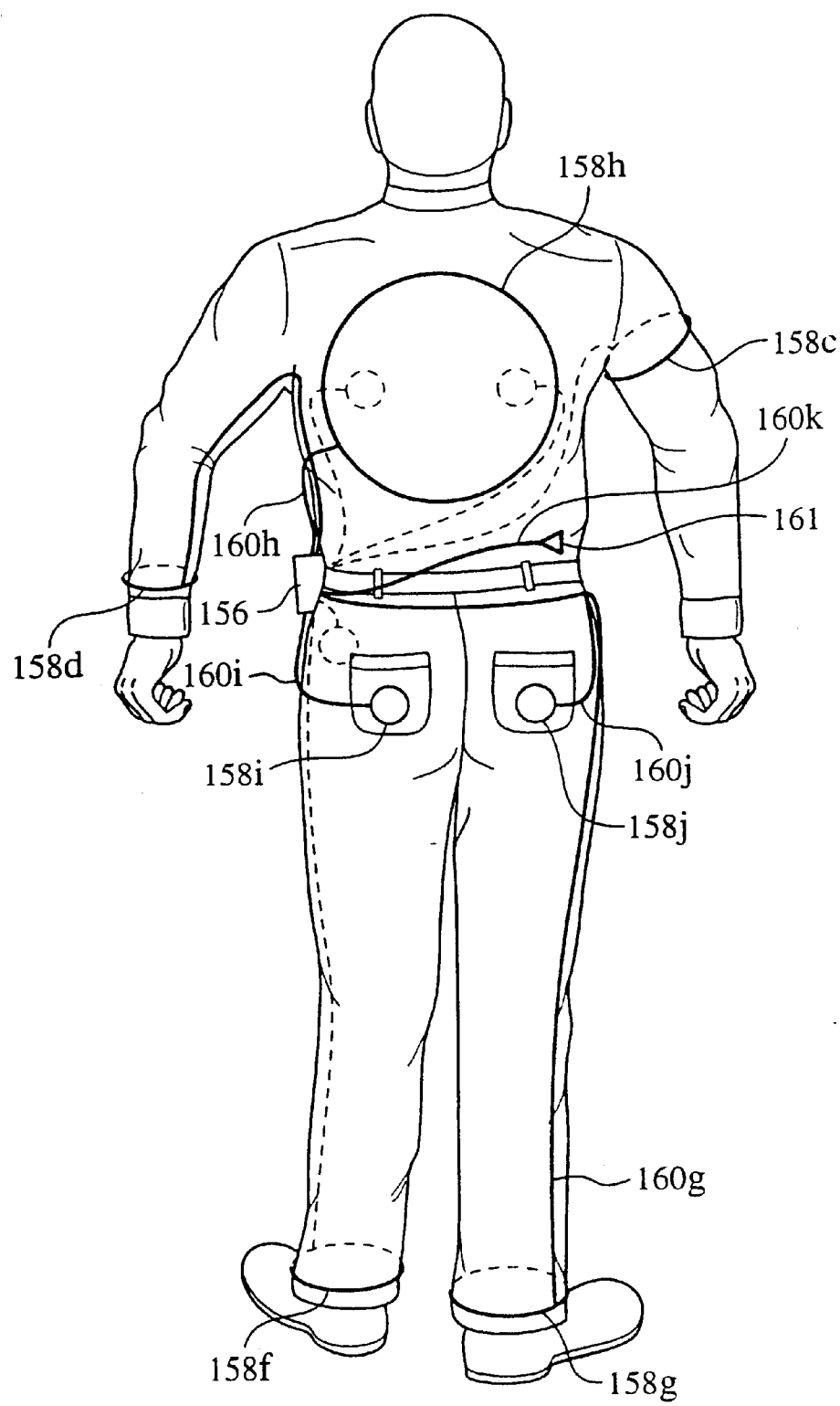

FIGS. 4A and 4B are front and rear views of a possible clothing implementation of a radio-frequency identification (RFID) transponder communication system 150. FIG. 4A is a front view of a human model 152 wearing a bodysuit 154 that includes a short-range communication system. For ease of understanding, the coupling ports and communication lines are drawn as solid lines on front, and dashed lines to indicate their location on the reverse side of the model. In this example, a wireless interrogator 156 is strapped to the waist of the model, but may be located in other regions, and may be attached to the garment by known means such as a belt or by other types of fasteners. The interrogator is directly or wirelessly connected to a network of coupling ports 158*a* to 158*j* by communication lines 160*a* to 160*j*. The coupling ports are strategically placed for communicating with transponders, and may be sewn or otherwise incorporated into locations such as a pocket, for example. The communication lines may be pairs of copper wire conductors sewn into the material of the garment, or may be pairs of conductive fibers that are woven into the garment during manufacture to create a web of communication lines. For safety purposes, the conductive fibers or wires may be insulated so that they do not dissipate any power. The rear view of FIG. 4B similarly depicts various strategic coupling ports 158*h* to 158*j* located in various regions. One or more communication lines having termination points that may include connectors for direct connection to transponders, such as communication line 160*k* with connector 161, could also be used. The communication system thus permits the short-range interrogator to communicate with transponders that ordinarily would be out of range of a typical wireless RFID system. Such a system enables the clothes worn by a person to communicate with a plurality of items and obtain useful information for the wearer, as explained below.

Figure 4C:
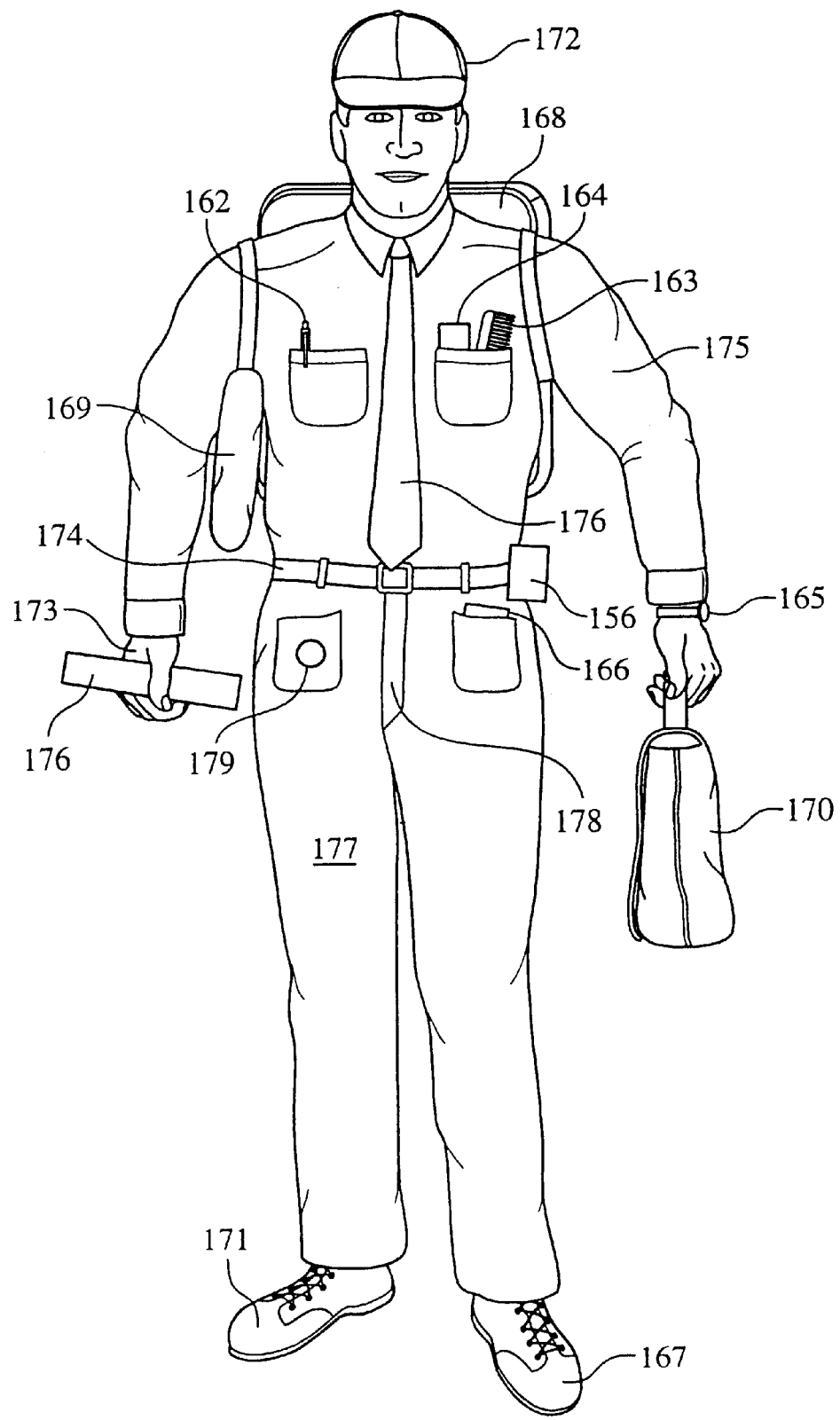
FIG. 4C is an example of a clothing implementation of a communications system including transponders according to the invention.

FIG. 4C illustrates how the communication system 150 adapted for communication with a plurality of transponders may appear. The interrogator 156 may use different RF modulation modes or different frequencies or other interrogation schemes to attempt to establish communications with transponders associated with a fountain pen 162, a comb 163, a glasses case 164, or any other object that may be inserted into a breast pocket. The transponders are monitored by coupling ports 158*a* and 158*b* (see FIG. 4A). Alternately, the interrogator may use a single frequency signal but identify particular items by the identification codes transmitted by any transponders that respond to an interrogation signal. The coupling port 158*d* may establish communication with a transponder associated with a wristwatch 165, and the coupling port 158*e* may establish communication with a transponder associated with a wallet 166 or money clip or house keys or electronic keys. The coupling ports 158*f* and 158*g* may establish communications with a transponder or transponders associated with a pedometer or other sensor that may be located in a shoe 167 or sock, and the coupling port 158*h* may establish communications with one or more transponders associated with one or more items in a backpack 168 or other bag 169 that may be slung over the back or shoulders of the user.

The interrogator 156 may have the capability to communicate with the entire set of remote locales using low power and a range of RF modes, and inform the wearer that all or some of the items listed above are included in a pocket of the garment, or are within a bag, backpack or some other form of luggage 170. Communication with transponders associated with items in a bag or other container may be possible when the bag is placed on her lap near coupling port, say, 158e or within the wireless range of the interrogator 156. Further, the interrogator may be able to provide data to the wearer via a display. For example, the display may be able to continuously update a mileage figure of the distance that the wearer has walked how fast the wearer is traveling, how many calories the wearer has burned, the location and/or orientation of the wearer, the temperature and other information that may be useful, for example, in developing a training program. These readings may be based on data received from the transponders in the vicinity of the coupling ports 158f and 158g, which are associated with sensors and a pedometer in the user's shoes 167, 171.

Many other applications of such a short range communications network are possible. For example, a transponder associated with a pen 162 may be configured to collect pen data such as how many signatures have been signed with the pen in a day, a month or some other time period, and transmit such data upon demand of an interrogator. Similarly, the wearer's clothes may communicate with other clothing items such as hats 172, gloves 173, belts 174, shirts 175, ties 176, pants 177 or fasteners such as zippers 178 and buttons 179, and transmit data to an interrogator 156 which can then determine if the pieces of clothing are color coordinated or not, and if the fasteners are closed or open, and display a message to the user. The interrogator of such a system may also be capable of communicating data to a personal digital assistant (PDA) device, a laptop computer, a cellphone 176, a desk phone, or other data processing device. The short-range interrogator system may also be able to communicate data to a computer mouse, a keyboard, or other input device. In addition, transponders associated with objects such as tables, chairs, automobile steering wheels, dashboards, and other items that can provide valuable feedback to a user. Furthermore, two or more transponders associated with different items may communicate with each other via the communications network. For example, a transponder in a bag could communicate with a sensor in the shoe of a person to determine the temperature so that an item can be used by the person at an optimal setting, or could communicate with a transponder associated with a cell phone to place a call to acquire or send data.

The network system 150 may be implemented such that the placement of the coupling ports and the power radiated by them confines their radiation field patterns, and those of the transponders, to small spaces to minimize undesirable interference. Further, the maximum range and coverage of a short-range, low-power interrogator is extended to multiple locales for communication with multiple transponders by the network of communication lines and coupling ports. In addition, the network system enables the localized and systematic interrogations of transponders attached to items confined in predetermined locations such as shirt and pants pockets, sleeves, shoes, back and other possible areas or regions distributed throughout a continuous piece of material or garment. Yet further, the network system may be configured so that any particular transponder can communicate with another transponder or group of transponders of other locales to actuate functions, cause actions, or otherwise share data and/or information.

Figure 5:
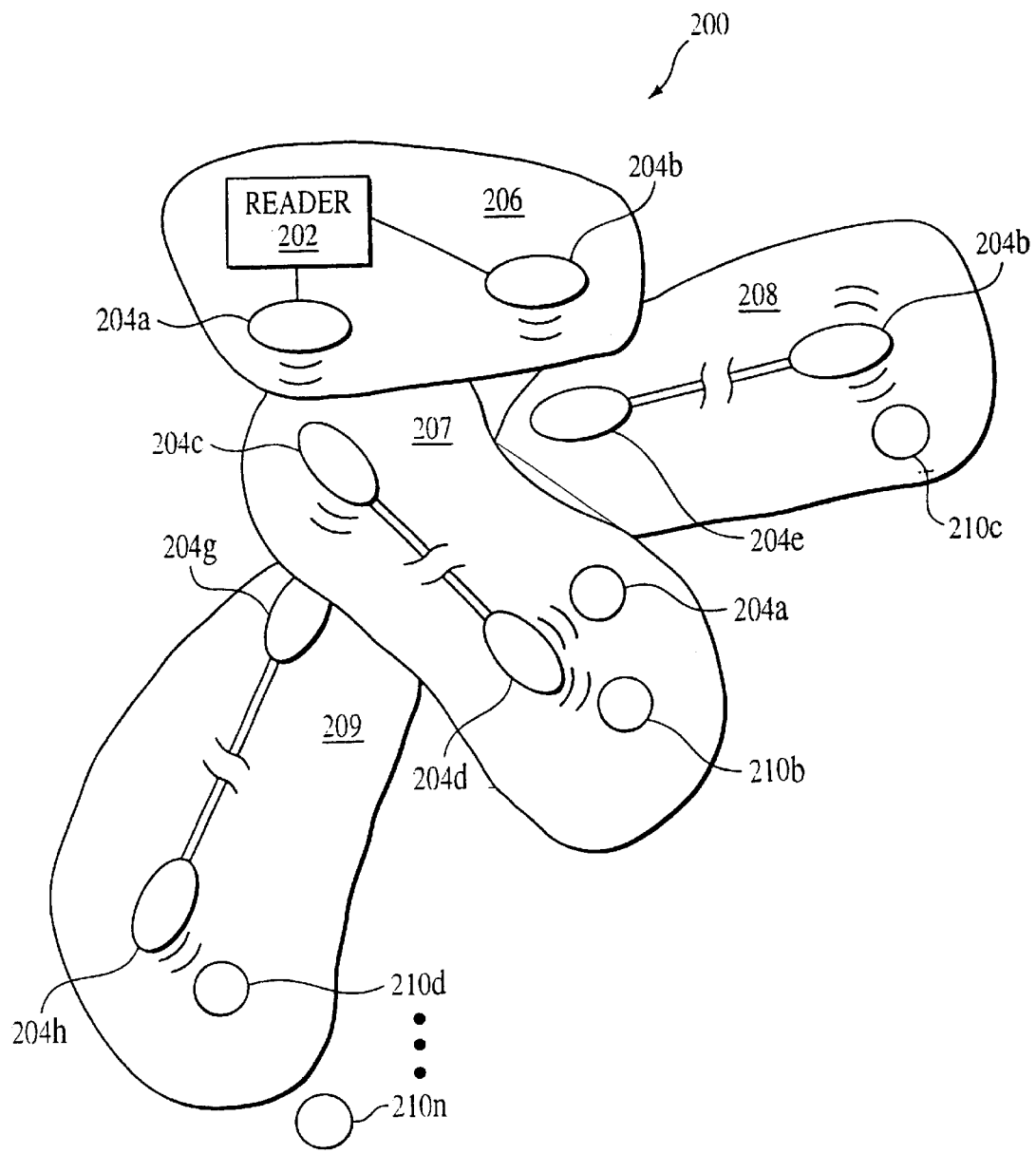
FIG. 5 is another implementation of a communication system according to the invention.

FIG. 5 illustrates another implementation of a low-power, short-range communication system 200. The system 200 includes an interrogator 202 and a network of coupling repeater ports 204a to 204h that are connected to separate items 206 to 209, such as different pieces of material, fabric or textiles. The coupling repeater ports are operable to inductively couple with each other to extend the range of the interrogator to span across multiple items, and are operable to communicate with transponders. The interrogator 202 operates as described above to transmit interrogation signals to the repeater ports and coupling ports to attempt communication with one or more transponders 210a to 210n. The system may use multiple frequencies and signal strengths to enable communications between the interrogator and multiple transponders associated with multiple items across gaps or discontinuities in material. The configuration enables the interrogation of transponders that are within the range of the coupling ports, which are distributed throughout two or more pieces of discontinuous material such as textiles, fabrics and garments. Thus, the RFID coverage can be conveniently localized to any piece of material and the maximum range extended by routing at least one coupling repeater port across the materials to arbitrary locations resulting in each piece being wirelessly connected to the other pieces.

Figure 6:
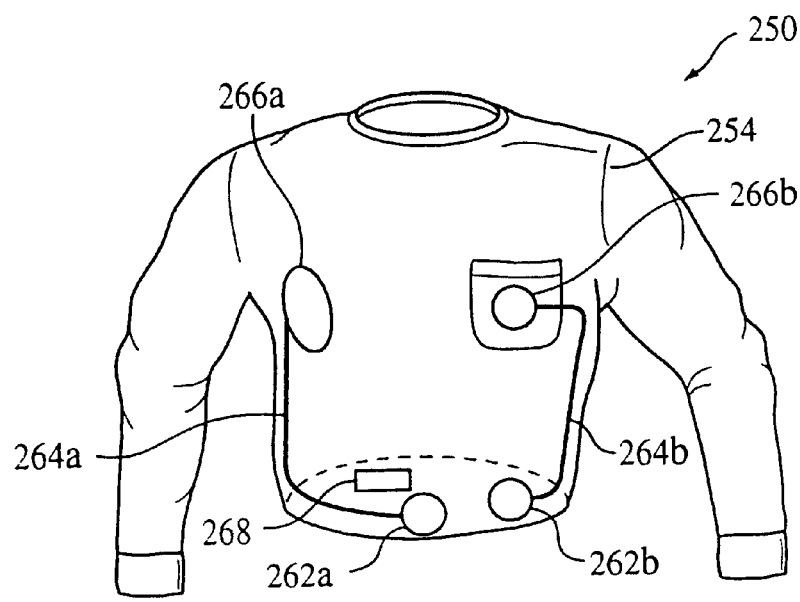
FIG. 6 illustrates a clothing implementation of the communication system of FIG. 5.
Figure 6:
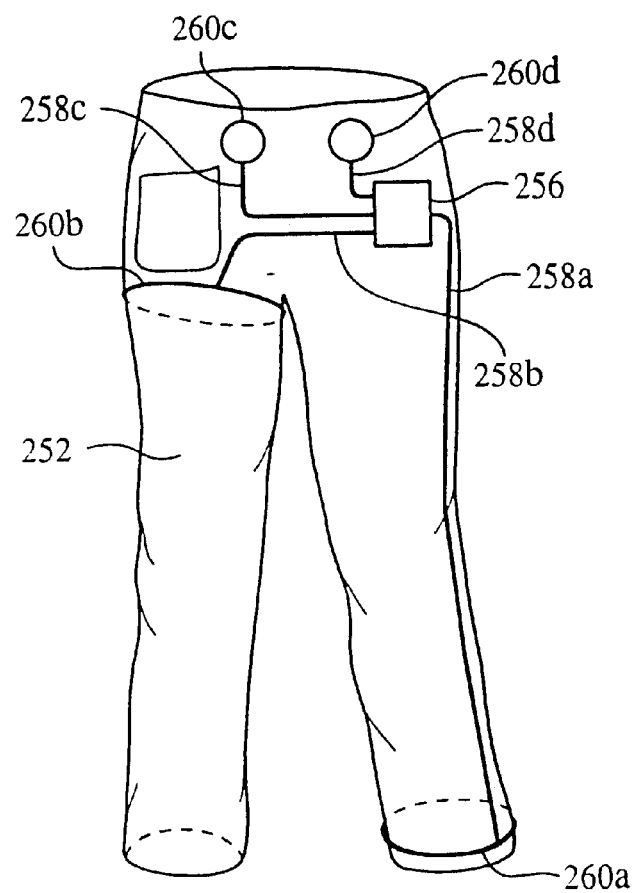

FIG. 6 illustrates a clothing implementation of a low-power, short-range communication system 250 of a type described with regard to FIG. 5. The system includes trousers 252 and a shirt 254. The trousers include an interrogator 256 connected to a coupling ports 260a and 260b and repeater ports 260c and 260d via communication lines 258a to 258d. The interrogator 256 is shown having direct connections to the communication lines 258a to 258d for ease of reference, but a wireless connection could easily be implemented by using one or more coupling ports in the vicinity of the interrogator. One advantage of a wireless connection is that different types of interrogators can easily be removed from and attached to the system. The repeater ports 260c and 260d of the pants are configured to communicate with repeater ports 262a and 262b associated with the shirt 254 when the shirt and pants are worn together such that they overlap. The repeater ports 262a and 262b are connected to coupling ports 266a and 266b via communication lines 264a and 264b. When the shirt and trousers are worn together by a user, a tight coupling is achieved and the interrogator transmits interrogation signals to, and receives transponder data from, the coupling ports 266a and 266b through the repeater ports 260c, 260d, 262a and 262b. The coupling port 266a may be used to monitor a handbag containing items with an associated transponder, while the coupling port 266b may be used to monitor items placed into a breast pocket. Similarly, the coupling port 260b may monitor a pants pocket, while the coupling port 260a may be used to monitor a shoe that may contain, for example, a pedometer and associated transponder. In addition, a transponder 268 could be sewn into the shirt within range of the coupling port 262a or any of the other coupling ports for reporting data characteristics of the shirt, such as manufacturer, style, size, color, texture and material composition. Another transponder may be sewn into or otherwise connected to the pants 252 to report the same or similar characteristics that may be reported for the shirt. Further, it is contemplated that such a communication system could be implemented in all types of garments such as shorts, jackets, coats, scarves, bikinis, swim trunks, lingerie, sports clothing such as football and soccer jerseys, other sportswear, dresses, skirts, gowns, jumpsuits and all other types of clothing and/or fashion accessories.

The communication system 250 could be used to communicate with a plurality of transponders associated with a wide variety of items, each item generating all types of item characteristic data as explained above. Furthermore, it is contemplated that various specialized transponders may be fabricated to store all types of data for communication with such RFID systems. For example, a coffee shop may have a transponder in the entryway for communication with patrons so that when a person passes within range of that transponder, the person can be notified that the coffee shop is open and that his friend is inside. Other transponder implementations could be used with earphones, listening devices, necklaces, rings, earrings, watches, bracelets, walking sticks, hockey sticks or other athletic gear, firearms, cups and other everyday accessories or items.

With regard to the communication system implementations described above in FIGS. 5 and 6, the number of turns of each of the two coupling loops of the coupling repeaters, such as coupling repeaters 260*c*, 262*a* and coupling port 266*a*, must be properly determined to permit semi-duplex or full duplex communications between a transponder and the interrogator. Thus, the first loop 260*c* can have a turn ratio of 1:n, while the second loop 262*a* may have a turn ration of m:p and the third loop 266*a* may have a turn ratio of q:r. In addition, as described above, such systems can use electronic circuitry, highly-ferromagnetic disks or other materials connected to the coupling ports or to the communications lines connecting the coupling ports or repeater ports to increase power and sensitivity to more easily communicate with transponders.

It is important to note that a RFID communication system of the types described herein are highly suitable for communicating information in all forms of systems. For example, a home system may include an interrogator and transponders associated with walls, floors, ceilings, windows, shutters, outside walls, roofs, gutters, chimneys, wallpaper, wood paneling, carpeting, other floor coverings, furnaces, hot water heaters, water pipes, gas pipes, and other home devices. Further, the system may include transponders associated with household furniture and appliances, including lamps and other fixtures. The transponders may report on the condition or status of such objects and/or devices, so that for example, renovations, cleaning and/or replacement can be recommended. A creative person would understand that the applications of such a system are virtually limitless, including being associated with biological sensors that may be worn in clothing or embedded below the epidermal layer of skin of the human body, or even mobile inside an animal body or the human body.

Other embodiments are within the scope of the following claims.

What is claimed is:

1. A method comprising:
   radiating an interrogation field over a first distance from a radiator, and
   extending the effective reach of the interrogation field to an array of locations that are more distant from the radiator than the first distance by conducting the energy of the field non-radiatively to the array locations.

2. The method of claim 1, wherein an interrogator radiates an interrogation field in a transponder status reporting mode.

3. The method of claim 1, wherein an interrogator radiates an interrogation field in a transponder locating mode.

4. The method of claim 1, wherein an interrogation transmits an interrogation signal in a transponder position mode.

5. The method of claim 1, wherein the interrogation field comprises a radio frequency field.

6. The method of claim 1, wherein a transponder is located within a predetermined second distance of at least one of the locations.

7. The method of claim 1, wherein the energy of the interrogation field is conducted to the array of locations by conductive elements.

8. The method of claim 7, wherein the conductive elements are insulated conducting wires.

9. The method of claim 7, wherein the conductive elements are insulated conductive fiber.

* * * * *